Figure 1:
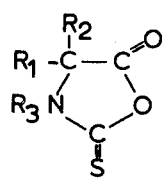
Figure 2:
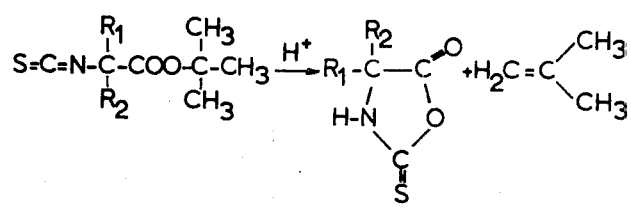
Figure 3:
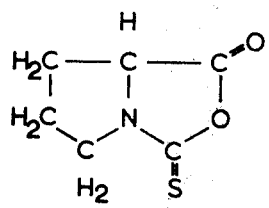

United States Patent [19]
Dahlmans et al.

[11] 3,905,988
[45] Sept. 16, 1975

[54] PROCESS FOR THE PREPARATION OF 2 THION-OXAZOLIDINONES AND DERIVATIVES THEREOF

[75] Inventors: Johannes J. Dahlmans, Maastricht; Wilhelmus H. J. Boesten, Sittard, both of Netherlands

[73] Assignee: Stamicarbon N.V., Geleen, Netherlands

[22] Filed: Feb. 18, 1971

[21] Appl. No.: 116,311

[30] Foreign Application Priority Data
Feb. 18, 1970 Netherlands ............... 7002228

[52] U.S. Cl............ 260/307 B; 260/112.5; 260/454; 260/471 R; 260/482 R
[51] Int. Cl.² ..................................... C07D 85/26
[58] Field of Search ..................... 260/307 B

[56] References Cited
UNITED STATES PATENTS

| | | |
|---|---|---|
| 2,327,162 | 8/1943 | Baldwin et al. ............... 260/307 |
| 2,630,423 | 3/1953 | MacDonald et al. .......... 260/78 |
| 2,649,458 | 8/1953 | Bennett et al. ............... 260/307 |
| 2,993,053 | 7/1961 | Ballard ........................... 260/307 |
| 3,184,469 | 5/1965 | Ishizuka et al. ............... 260/307 |
| 3,467,667 | 9/1969 | Schwam ......................... 260/307 |

*Primary Examiner*—Donald G. Daus
*Assistant Examiner*—Raymond V. Rush
*Attorney, Agent, or Firm*—Cushman, Darby & Cushman

[57] ABSTRACT

A process for the preparation of 2-thionoxazolidone-5 and derivatives thereof is disclosed wherein tertiary alkyl esters of secondary amino carboxylic acid or the N-thiocarbonyl chloride of an α-secondary aminocarboxylic acid is subjected to the action of a proton yielding acid. The compounds produced by the process of this invention are useful as amino acid derivatives in the synthesis of peptides.

6 Claims, 1 Drawing Figure

PROCESS FOR THE PREPARATION OF 2 THION-OXAZOLIDINONES AND DERIVATIVES THEREOF

This application is related to our copending U.S. applications Ser. No. 116,312, now abandoned, and Ser. No. 116,313 now U.S. Pat. No. 3,740,386 filed concurrently with this application and entitled "Preparation of Tertiary Alkyl Esters of α-isothiocyanate Carboxylic Acids" and "Preparation of Peptides", respectively. The entire disclosures of these copending applications are incorporated herein by reference.

The present invention relates to a process for the preparation of 2-thion-oxazolidone-5 and derivatives thereof. It concerns new compounds, not previously prepared and isolated, having the structure

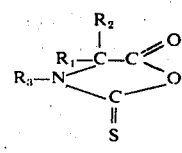

where $R_1$ represents a hydrogen atom or the side chain residue of an α-amino acid, $R_2$ represents a hydrogen atom or a lower alkyl group, whether or not substituted and $R_3$ represents a hydrogen atom, a lower alkyl group or an alkylene group when taken together with $R_1$ forming a ring. By the side chain residue of an α-amino acid is here understood the grouping, whether or not substituted, which is bound to the α-carbon atom of natural or synthetic α-aminocarboxylic acids, whether or not optically active.

These new compounds can be prepared according to the invention by contacting a tertiary lower alkyl ester of an α-isothiocyanate carboxylic acid or of an N-thiocarbonyl chloride compound of an α-secondary-aminocarboxylic acid in a liquid, organic medium containing hydrogen ions which can be from a strong, proton-yielding acid.

The tertiary alkyl group is removed from the ester with forming of an alkene or a compound substituted with the proton yielding acid. During this process, free α-isothiocyanate acid evolves which is converted into the desired compound by an intra-molecular ring closure. The reaction is believed to proceed, as shown by the equation

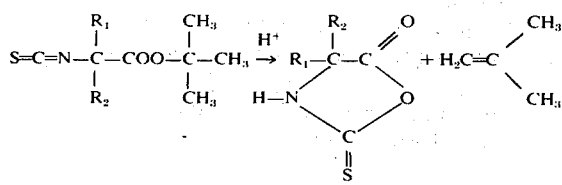

when the tertiary butyl ester of an α-isothiocyanate carboxylic acid has been started from. The tertiary alkyl esters of α-isothiocyanate carboxylic acids are prepared and with a high yield by reaction of a tertiary lower alkyl ester of an α-aminocarboxylic acid and a compound possessing an activated thiocarbonyl group, such as thiophosgene or thiocarbonyl-NN'-diimidazole, as fully described in copending application Ser. No. 116,312 referred to above.

The group $R_2$ occurring in the above formula may represent a hydrogen atom or a lower alkyl group, whether or not substituted, and the group $R_1$ may represent a hydrogen atom or the side chain residues of an amino acid. In the side chain residue of an amino acid, many different substituents may occur, such as amino-, hydroxyl-, carboxyl-, thiol- or guanidine-groups. Such substituents can interfere with the reaction or can be converted during the reaction into other undesirable substituents, and so they must be protected and inactivated during the reaction. In the peptide chemistry many methods of protecting these groups are known. An amino group, for instance, may be protected by conversion into an N-carbobenzoxy-amino group, while hydroxyl- and thiol-groups may be converted, for reasons of protection, into esters or ethers, for instance, into benzyl ethers or benzyl thioethers. The carboxyl group need not be protected during the reaction.

A few examples of suitable starting materials are the tertiary lower alkyl esters of α-isothiocyanate phenlyalanine, α-isothiocyanate valine, α-isothiocyanate aspartic acid, α-isothiocyanate leucine, α-isothiocyanate glycine, α-isothiocyanate alanine, α-isothiocyanate glutamic acid, N-ε-carbobenzoxy-α-isothiocyanate lysine, S-benzyl-α-isothiocyanate cysteine, o-benzyl-α-isothiocyanate serine.

Proline and hydroxyproline with a protected hydroxyl group possess a secondary α-amino group and react with thiophosgene to N-thiocarbonyl chloride compounds exclusively. These compounds, however, can be converted to ring-compounds in the same way as the α-isothiocyanate carboxylic acid-tertiary alkyl esters. The N-thiocarbonyl chloride-proline tertiary alkyl ester yields a compound having the formula

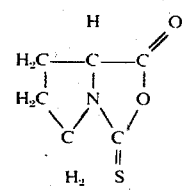

If an optically active α-isothiocyanate or N-thiocarbonyl chloride compound is used as a starting material, an optically active 2-thion-oxazolidone-5 compound is obtained.

The protons may have originated with various strong acids, such as trifluoroacetic acid, paratoluenesulphonic acid and hydrochloric acid. The reaction also proceeds excellently if gaseous compounds possessing an acid H-atom are passed through the organic medium.

In a preferred mode of performing the reaction, in which case the reaction gives high yields, gaseous HCl is fed into the organic medium, with formation of the 2-thion-oxazolidone-5 derivative and the unsaturated hydrocarbon and/or tertiary alkyl chloride. Preference is given to starting from the tertiary butyl esters of the α-isocyanate carboxylic acids because, in the presence of a strong acid, they decompose very readily to the free acid and isobutene or a tertiary butyl-strong acid residue compound.

Organic inert solvents are used in which, preferably, the reactants can be dissolved. Suitable solvents are, e.g., methylene chloride, chloroform, ethyl acetate, carbon tetrachloride and benzene.

The temperature at which the reaction is carried out ranges between −40°C and +80°C, depending on the solvent and the desired reaction speed. The reaction is preferably effected at a temperature of between 0°C and 25°C.

The 2-thion-oxazolidone-5 and the derivatives thereof are new compounds, which can be used in many kinds of syntheses because the 5-carbonyl group is very active. They are, in particular, suitable for use as an amino acid derivative in the synthesis of peptides because of the activated carbonyl group and the protected amino group. The preparation of novel peptides from the compounds of this invention is described in our above-mentioned copending application Ser No. 116,313.

The compounds obtained by the process according to this invention are solid, recrystallizable substances, which are stable, at least at temperatures below their melting point. The 2-thion-oxazolidone-5-structure of the present compounds have been verified on the basis of the mode of preparation, the chemical properties, the elementary analysis and the spectra which have been taken. There have been previous reports to the effect that the 2-thion-oxazolidone-5 should have been prepared; however, these reports have been disproved (see Aubert c.s., Journal of the Chemical Society 1951, page 2195, etc.).

The invention will be further described by the following examples.

EXAMPLE 1

In 50 ml of absolute ethyl acetate 6.6 grams of tertiary butyl (0.025 mole) ester of α-isocyanate phenyl alanine were dissolved, and while the solution was being stirred, gaseous HCl was passed through the solution for 4 hours at a reaction temperature of 25°C. Upon completion of the reaction, the ethyl acetate and any remaining HCl were evaporated off and a solid substance remained. By recrystallization from a benzenehexane mixture, 4.1 g of pure 4-benzyl-2-thion-oxazolidone-5 with a melting point of 99°C were obtained. The purity was confirmed by a thin-layer chromatographic test with silica gel as carrier and dioxane as liquid.

EXAMPLE 2

Gaseous HCl was passed through a solution of 21.5 g tertiary butyl ester of α-isothiocyanate valine (0.1 mole) in 150 ml of ethyl acetate for 2 hours and at a temperature of 0°C. Upon completion of the reaction, the ethyl acetate and any remaining HCl were removed by distillation at 12 mm Hg and 25°C. The residue was recrystallized from an ethyl acetate-hexane mixture, so that 11.2 g of pure 4-isopropyl-2-thion-oxazolidone-5 having a melting point of 78°C were obtained. A thin-layer chromatographic test (silica gel, dioxane) confirmed the substance was quite pure.

EXAMPLE 3

Gaseous HCl was passed through a solution of 0.1 mole (28.7 g) of di-tertiary butyl ester of α-isothiocyanate aspartic acid in 300 ml of methylene chloride for 2.5 hours at a temperature of −5°C. After filtration and removal of methylene chloride and HCl by distillation a residue wsa left which, after recrystallization from a methylene chloride - hexane mixture, yielded 13.9 g of pure 4-carboxylmethyl-2-thion-oxazolidone-5.

EXAMPLE 4

In a medium of water and methylene chloride, present in a ratio of 2 : 1, the tertiary butyl ester of leucine was allowed to react with a slight excess quantity of thiophosgene for 2 hours at a pH of 3 and a temperature of −7°C. Upon completion of the reaction, the methylene chloride phase was separated off, washed with water and dried. In this way a solution of the pure tertiary butyl ester of α-isothiocyanate leucine in methylene chloride was obtained.

Gaseous HCl was passed through the resulting solution of 0.09 mole (19.9 g) of tertiary butyl ester of α-isothiocyanate leucine in 600 ml of methylene chloride for 2 hours at a temperature of −20°C. After concentration of the reaction mixture by evaporation and recrystallization, 11.5 g of pure 4-isobutyl-2-thion-oxazolidone-5 with a melting point of 74°C were obtained.

What is claimed is:

1. Process for preparing a 2-thion-oxazolidinone-5-compound of the formula

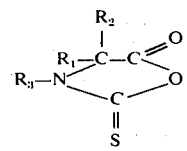

wherein $R_1$ is hydrogen or the group bonded to the α-carbon atom of a natural α-amino acid, $R_2$ is hydrogen and $R_3$ is hydrogen or when taken together with $R_1$ forms the proline or O-protected hydroxyproline ring comprising the step of reacting in an inert liquid organic reaction medium the corresponding tertiary lower alkyl ester of an α-isothiocyanate carboxylic acid or of an N-thiocarbonyl chloride compound of a natural α-amino acid while continuously passing gaseous hydrogen chloride through the reaction medium until completion of the reaction at a temperature of between about −40° C and +80° C.

2. Process according to claim 1 wherein said α-isothiocyanate carboxylic acid is selected from the group consisting of α-isothiocyanate phenylalanine, α-isothiocyanate valine, α-isothiocyanate aspartic acid, α-isothiocyanate leucine, α-isothiocyanate glycine, α-isothiocyanate alanine, α-isothiocyanate glutamic acid, N- ε - carbobenzoxy-α-isothiocyanate lysine, S-benzyl-α-isothiocyanate cysteine, O-benzyl-α-isothiocyanate serine.

3. A process for preparing a 2-thionoxazolidinone-5-compound of the formula:

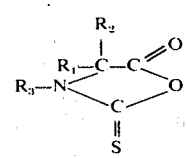

wherein $R_1$ is hydrogen or the group bonded to the α-carbon atom of a natural α-amino acid, $R_2$ is hydrogen and $R_3$ is hydrogen comprising the step of reacting in an inert liquid organic medium a compound of the formula:

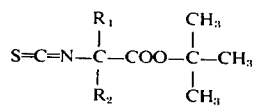

wherein $R_1$, $R_2$ have the meaning given above while continuously passing gaseous hydrogen chloride through the reaction medium until completion of the reaction at a temperature of between about −40° C and +80° C.

4. A process according to claim 1 wherein the inert liquid organic reaction medium is selected from the group consisting of methylene chloride, chloroform, ethyl acetate, carbon tetrachloride and benzene.

5. A process according to claim 1 wherein the reaction is conducted at a temperature of between 0° C and +25° C.

6. Process for preparing a 2-thion-oxazolidinone-5 compound of the formula

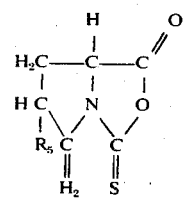

where $R_5$ is hydrogen or protected hydroxyl comprising the step of reacting the corresponding N-thiocarbonyl chloride of a tertiary lower alkyl ester of a proline or O-protected hydroxyproline in an inert organic liquid reaction medium at a temperature between about −40° C and +80° C while continuously passing gaseous hydrogen chloride through the reaction medium until completion of the reaction.

* * * * *